fill in here …

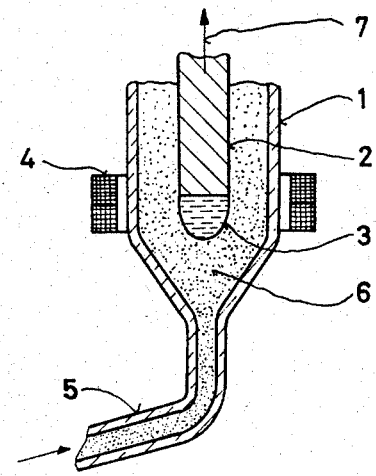
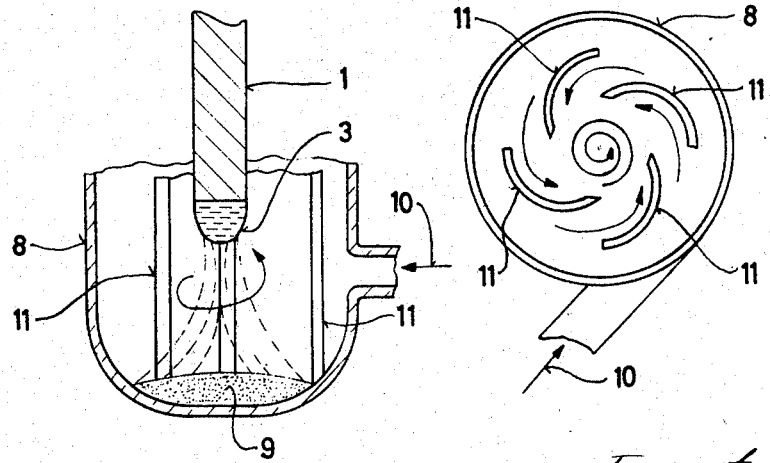

2,907,642
APPARATUS FOR FUSING PULVERULENT SEMICONDUCTOR MATERIAL

Theodor Rummel, Munich, Germany, assignor to Siemens & Halske Aktiengesellschaft, Munich and Berlin, Germany, a corporation of Germany Application May 19, 1955, Serial No. 509,669

Claims priority, application Germany May 25, 1954

1 Claim. (Cl. 23—273)

This invention is concerned with the problem of fusing highly purified powderized, semiconductor material, or material of this kind colloidally distributed in gaseous phase, to produce a crystalline melted product, without introducing into such product, by the melting operation, impurities such as may for example be caused by the use of crucibles or the like.

This problem is of particular importance in the production of semiconductor material for use in rectifiers, transistors, photo transistors, thermo elements, fieldistors, magnetically and/or electrically affected resistors, varistors, heat conductors, and the like.

It is, for example, possible to produce silicon in highly purified form or in fine crystalline powderlike form by thermal decomposition or in accordance with the so-called zinc-vapor process. The powderlike or pin-shaped crystalline bodies thereby produced were heretofore fused in crucibles made of quartz and kept as clean as possible. However, impurities from the crucible material are in such operations introduced into the melt which tend to contaminate the highly purified material obtained.

It has been proposed to avoid the use of crucibles in the fusing of such pulverulent masses, by fusing the semiconductor material, for example, silicon, to the surface of a highly purified semiconductor body serving as a carrier, thereby producing a molten drop supported thereby. If the fusing powder is permitted to trickle down upon this drop, the individual powderlike particles will fuse into the melt. If the drop is drawn downwardly and progressively out of the heating zone, a crystalline rod of the molten semiconductor material will grow upon the original semiconductor body.

It has also been proposed to provide the arrangement so that a molten drop will appear upon the lower end of a vertically extending silicon rod and that this drop is immersed, suitably regularly, into silicon powder provided thereunder, whereby a series of silicon powder bodies are always attracted by the molten drop. The silicon rod gradually grows in this manner downwardly.

Another prior proposal suggests to produce a freely suspended drop of a semiconductor material, for example, silicon, in an electromagnetic field produced by a suitable combination of magnetic coils, and to scatter upon this drop from above or from the sides thereof silicon powder or rather to say silicon particles. This drop may then be drawn out by a solid body, suitably made of the same semiconductor material, downwardly or laterally, suitably at its greatest extent at which is effected a low eddy current heating, so that the drop cools gradually, becoming solidified. It is possible to fuse in this manner without a crucible relatively large amounts of semiconductor powder to form a crystalline body.

The invention is concerned with a variation of the above-indicated methods and distinguishes therefrom by accomplishing in particularly simple manner the physical contacting of the molten semiconductor mass with the semiconductor powder.

In accordance with the invention, a highly purified semiconductor powder is fused into a melt by bringing the powder into contact with the melt surface by means of a gas or vapor stream. The gas or vapor stream may be a laminated stream or a turbulent stream which is suitably directed upon the surface of the melt. The corresponding pneumatic conveying effect may if desired be supported by an electrically produced blowing effect, by electrically charging the semiconductor particles in known manner and keeping the semiconductor melt at an opposite potential. An inert gas or a reducing gas, for example, hydrogen, is suitable as a carrier gas or as a vapor carrier. It is, however, under some circumstances suitable to add in known manner to the carrier gas stream which may, for example, be hydrogen, a weak oxidizing atmosphere comprising, for example, water vapor, carbonic oxide or carbon dioxide.

In accordance with a particular embodiment of the invention, the fluid mass is produced upon the surface of a mono crystal which is arranged with suitable and desired orientation. This produces the possibility to draw by cooling the opposite side, a mono crystal from the fluid mass enlarged by the semiconductor bodies introduced thereinto.

The various objects and features of the invention will appear from the following description rendered below with reference to the accompanying drawing in which Fig. 1 shows in schematic manner an embodiment employing hydrogen as a carrier for conveying particles of a semiconductor material against a molten portion of a semiconductor for fusion therewith;

Fig. 2 shows similarly schematically an embodiment for producing a gyrating stream of semiconductor particles to convey such particles against a molten part of a semiconductor body for fusion therewith; and Fig. 3 shows a schematic sectional view of the arrangement according to Fig. 2.

In Fig. 1, numeral 1 indicates a quartz vessel in which is by suitable means disposed a vertically extending silicon rod 2. The lower end of the silicon rod 2 is molten to form a freely suspended drop 3. The heating for producing the drop may be effected by the action of a high-frequency coil 4 after preheating the rod, in known and suitable manner, for example, by radiation or by means of a gas discharge. A stream of hydrogen is in suitable manner directed from underneath against the fluid drop 3 through a tube 5, such stream carrying along highly purified silicon powder. There will be in this manner produced a turbulent cloud of silicon powder around the drop 3, which is adsorbed by the melt 3.

The rod 2 is by suitable means progressively drawn upwardly in the direction of the arrow 7, as the precipitated silicon powder enlarges the drop 3, thereby causing the upper end of the drop 3 to cool off and to solidify gradually. In this manner is obtained, without the use of a crucible, a silicon rod of highest purity fused together by the silicon owder conveyed by the hydrogen.

The silicon rod thus produced may be subsequently subjected to known and previously proposed melting zone drawing methods in which the rod is similarly disposed vertically so that the melting process serving further purification may be carried out without a crucible.

A coarser crystalline structure or a mono crystal may, if desired, be produced, in previously suggested manner, by repeated application of the zone melting in the vertically disposed rod even without the use of a mono crystal.

It is possible, as shown in Figs. 2 and 3, to blow the silicon powder against the freely suspended molten silicon drop 3 by a gyrating stream. For this purpose, there is provided in the vessel 8, underneath the molten drop 3, a supply 9 of silicon, which is turbulently agitated by a carrier gas stream blown in from the outside in the direction of the arrow 10 vanes 11 being provided to cause said stream to gyrate so as to lift the powder particles 9 turbulently from the bottom of the vessel 8, directing them against the molten drop 3 for fusion therewith.

The invention is not inherently limited to the illustrated embodiments. For example, the heating for producing the liquid drop may be effected differently and if desired by a gaseous discharge. Depending upon whether the operation is effected with direct current or with alternating current or with multi-phase current, the liquid drop may be produced upon one or more semiconductor rods serving as discharge electrodes. The semiconductor rods are as indicated in Fig. 1, gradually drawn from the vessel so that they melted zones cool off in accordance with the growth of the corresponding molten portion due to the fusion thereto of the semiconductor particles.

It is in corresponding manner possible to enlarge rod-shaped semiconductor bodies the cylindrical surfaces of which are wholly or partially fused thereon; and it is further possible to form one or more zones within a suitably arranged and at its ends suitably supported rod to produce midway thereof melting zones and to enlarge such zones by blowing against them semiconductor material as described. By corresponding drawing-apart of the rod portions, it is in this manner possible, to obtain elongation of the rods while maintaining uniform thickness.

The body or bodies on which the molten mass is formed may be rotated or at least the molten fusion zone may be rotated or otherwise moved during the fusing operation, so as to support uniform fusion of the material.

It is also possible to combine with the method according to the invention a known doping operation so as to produce from a gaseous phase or from a liquid or by the scattering of solid bodies into the fusion zone predetermined conduction types by embedding donators, acceptors, etc., therein.

The arrangement according to the invention may also be combined in a structural unit with an arrangement for producing the finely divided semiconductor material.

Known and suitable means, omitted from the figures shown in the drawing to keep them simple, may be used for carrying out all operations so as to satisfy the intents and purposes of the invention as described above and as expressed in the appended claims, and changes may likewise be made within the scope and spirit of the claims in which is defined what is believed to be new and desired to have protected by Letters Patent.

I claim:

Apparatus for producing highly pure semiconductor bodies of the class of silicon comprising a vessel containing a vertically disposed highly pure rodlike semiconductor member of the class of silicon, inductive heating means disposed externally of a lower portion of said vessel to heat the lower end of the member and produce a molten portion at its lower end, said vessel having a bottom wall adapted to support a supply of highly pure powdered semiconductor particles of a material corresponding to the material of the semiconductor member, a plurality of arcuate vanes in said vessel extending from a point above the lower end of said member downwardly substantially to said bottom wall, means defining an inlet passage opening into said vessel tangentially with respect to said vanes, and means for blowing a gas through said passage to produce a gyrating stream to pick up particles from said supply and project them against the molten portion of said member for fusion therewith.

References Cited in the file of this patent

UNITED STATES PATENTS

| | | |
|---|---|---|
| 2,475,810 | Theuerer | July 12, 1949 |
| 2,793,103 | Emeis | May 21, 1957 |

FOREIGN PATENTS

| | | |
|---|---|---|
| 243,251 | Great Britain | Nov. 26, 1925 |